United States Patent
Yang et al.

(10) Patent No.: US 11,880,919 B2
(45) Date of Patent: Jan. 23, 2024

(54) STICKER PROCESSING METHOD AND APPARATUS

(71) Applicant: Beijing Bytedance Network Technology Co., Ltd., Beijing (CN)

(72) Inventors: Jie Yang, Beijing (CN); Yantong Wei, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/886,359

(22) Filed: Aug. 11, 2022

(65) Prior Publication Data

US 2022/0392129 A1 Dec. 8, 2022

Related U.S. Application Data

(63) Continuation of application No. PCT/CN2021/077985, filed on Feb. 25, 2021.

(30) Foreign Application Priority Data

Mar. 19, 2020 (CN) .......................... 202010198167.9

(51) Int. Cl.
*G06T 11/60* (2006.01)
*G06T 7/33* (2017.01)
*G06F 3/0481* (2022.01)

(52) U.S. Cl.
CPC ............ *G06T 11/60* (2013.01); *G06F 3/0481* (2013.01); *G06T 7/337* (2017.01)

(58) Field of Classification Search
None
See application file for complete search history.

(56) References Cited

U.S. PATENT DOCUMENTS

| | | | |
|---|---|---|---|
| 2012/0162211 A1* | 6/2012 | Choi | G02B 30/25 345/419 |
| 2013/0231899 A1* | 9/2013 | Khardekar | G06F 30/00 703/1 |

(Continued)

FOREIGN PATENT DOCUMENTS

| | | |
|---|---|---|
| CN | 102540491 A | 7/2012 |
| CN | 105892869 A | 8/2016 |

(Continued)

OTHER PUBLICATIONS

Zhao, "Method, Device and Apparatus for Quickly Placing UI Control On Virtual Canvas", WIPO IP Portal, Oct. 29, 2019, CN110389810, English Translation (Year: 2019).*

(Continued)

*Primary Examiner* — David H Chu
(74) *Attorney, Agent, or Firm* — ARENTFOX SCHIFF LLP

(57) ABSTRACT

The present disclosure discloses a sticker processing method, an apparatus, an electronic device and a computer-readable storage medium. The method includes: acquiring an image and a sticker; determining a target reference line, where the target reference line is used to identify an adding position of the sticker in the image; detecting a position change of the sticker in the image in response to a user's moving operation on the sticker; determining a final attachment state of a preset reference line on the sticker and the target reference line according to the position change; and moving the sticker to the adding position if the final attachment state is an attached state.

16 Claims, 2 Drawing Sheets

(56) References Cited

U.S. PATENT DOCUMENTS

2016/0364080 A1* 12/2016 Dayan ................. G06F 3/04186
2018/0166709 A1*  6/2018 Lee ....................... H01M 8/124
2018/0182149 A1   6/2018 Chong et al.
2020/0034033 A1   1/2020 Chaudhri et al.

FOREIGN PATENT DOCUMENTS

| CN | 205751453 U | 11/2016 |
| CN | 108920053 A | 11/2018 |
| CN | 108958610 A | 12/2018 |
| CN | 109191544 A | 1/2019 |
| CN | 109495791 A | 3/2019 |
| CN | 110389810 A | 10/2019 |
| CN | 110572709 A | 12/2019 |
| CN | 111309225 A | 6/2020 |
| JP | 2003099794 A | 4/2003 |
| JP | 2013516651 A | 5/2013 |
| JP | 2018129802 A | 8/2018 |

OTHER PUBLICATIONS

International Search Report and Written Opinion issued in International Patent Application No. PCT/CN2021/077985 dated May 26, 2021.
Office Action in CN202010198167.9, dated Feb. 3, 2023, 12 pages.
Office Action in IN202227055637, dated Feb. 7, 2023, 7 pages.
Extended European Search Report in EP21770661.3, dated Jul. 31, 2023, 9 pages.
Office Action dated Dec. 5, 2023, in Japanese Application No. 2022-556501, 7 pages.

* cited by examiner

STICKER PROCESSING METHOD AND APPARATUS

CROSS-REFERENCE TO RELATED APPLICATIONS

This application is a continuation of International Application No. PCT/CN2021/077985, filed on Feb. 25, 2021, which claims priority to Chinese patent application No. 202010198167.9 filed on Mar. 19, 2020 and entitled "STICKER PROCESSING METHOD AND APPARATUS", both of the above applications are hereby incorporated by reference in their entireties.

TECHNICAL FIELD

The present disclosure relates to the technical field of image special effect processing and, in particular, to a sticker processing method, an apparatus and a computer-readable storage medium.

BACKGROUND

With the development of smart terminal technology, functions of smart terminals are becoming more and more diverse. For example, users may use cameras in the terminals to shoot images (e.g., photos or videos), which has become a new mode of entertainment for people. However, simply shooting images may no longer satisfy the needs of the users. Then how to perform special effect processing on the captured images to obtain more funny and interesting images has become the focus of people's attention.

In the prior art, there is a special effect of adding a sticker to an image. The details are as follows: a user selects an adding position of a sticker in an image in advance, and then drags the sticker directly on the adding position. Since the adding position is an approximate position selected by the user through eyes, the sticker cannot be precisely positioned.

SUMMARY

The Summary section is provided to introduce concepts in a simplified form, and these concepts will be described in detail in the Description of Embodiments section that follows. The Summary section is not intended to identify key features or essential features of the claimed technical solutions, nor is it intended to limit the scope of the claimed technical solutions.

The technical problem solved by the present disclosure is to provide a sticker processing method to at least partially solve the technical problem that a sticker cannot be accurately positioned in the prior art. In addition, a sticker processing apparatus, a sticker processing hardware apparatus, a computer-readable storage medium and a sticker processing terminal are further provided.

In order to achieve the above purpose, according to an embodiment of an aspect of the present disclosure, the following technical solution is provided:

a sticker processing method, including:
acquiring an image and a sticker;
determining a target reference line, where the target reference line is used to identify an adding position of the sticker in the image; and detecting a position change of the sticker in the image in response to a user's moving operation on the sticker;
determining a final attachment state of a preset reference line on the sticker and the target reference line according to the position change;
moving the sticker to the adding position if the final attachment state is an attached state.

In order to achieve the above purpose, according to an embodiment of an aspect of the present disclosure, the following technical solution is provided:

a sticker processing apparatus, including:
an acquiring module, configured to acquire an image and a sticker;
a reference line determining module, configured to determine a target reference line, where the target reference line is used to identify an adding position of the sticker in the image;
a position detecting module, configured to detect a position change of the sticker in the image in response to a user's moving operation on the sticker;
a state determining module, configured to determine a final attachment state of a preset reference line on the sticker and the target reference line according to the position change;
a sticker moving module, configured to move the sticker to the adding position if the final attachment state is an attached state.

In order to achieve the above purpose, according to an embodiment of an aspect of the present disclosure, the following technical solution is provided:

an electronic device, including:
a memory, configured to store non-transitory computer-readable instructions; and
a processor, configured to run the non-transitory computer-readable instructions, where the sticker processing method according to any of the above is implemented when the non-transitory computer-readable instructions are executed by the processor.

In order to achieve the above purpose, according to an embodiment of an aspect of the present disclosure, the following technical solution is provided:

a computer-readable storage medium, configured to store non-transitory computer-readable instructions which, when executed by a computer, causes the computer to execute the sticker processing method according to any of the above.

In order to achieve the above purpose, according to an embodiment of an aspect of the present disclosure, the following technical solution is provided:

a sticker processing terminal, including any of the above sticker processing apparatuses.

In order to achieve the above purpose, according to an embodiment of an aspect of the present disclosure, the following technical solution is provided:

a computer program product, including a computer program carried on a computer-readable medium, where a processor is caused to execute the sticker processing method according to any of the above when the computer program is executed by the processor.

In order to achieve the above purpose, according to an embodiment of an aspect of the present disclosure, the following technical solution is provided:

a computer program which, when running on an electronic device, causes the electronic device to execute the sticker processing method according to any of the above.

In the embodiments of the present disclosure, the position of the sticker can be positioned precisely by determining coordinates of the target reference line, determining the final attachment state of the preset reference line of the sticker and the target reference line according to the position change of the sticker in the image, and moving the sticker to the adding position if the final attachment state is the attached state. The above description is only an overview of the technical solutions of the present disclosure. In order to understand the technical means of the present disclosure more clearly so that they can be implemented according to the content of the description, and to make the above and other purposes, features and advantages of the present disclosure more obvious and easy to understand, the preferred embodiments that are exemplified in the following are described in detail as follows in conjunction with the accompanying drawings.

BRIEF DESCRIPTION OF DRAWINGS

The above and other features, advantages and aspects of embodiments of the present disclosure will become more apparent when taken in conjunction with the accompanying drawings and with reference to the following detailed embodiments. Throughout the drawings, the same or similar reference numbers refer to the same or similar elements. It should be understood that the drawings are schematic and that originals and elements are not necessarily drawn to scale.

DESCRIPTION OF EMBODIMENTS

Figure 1:
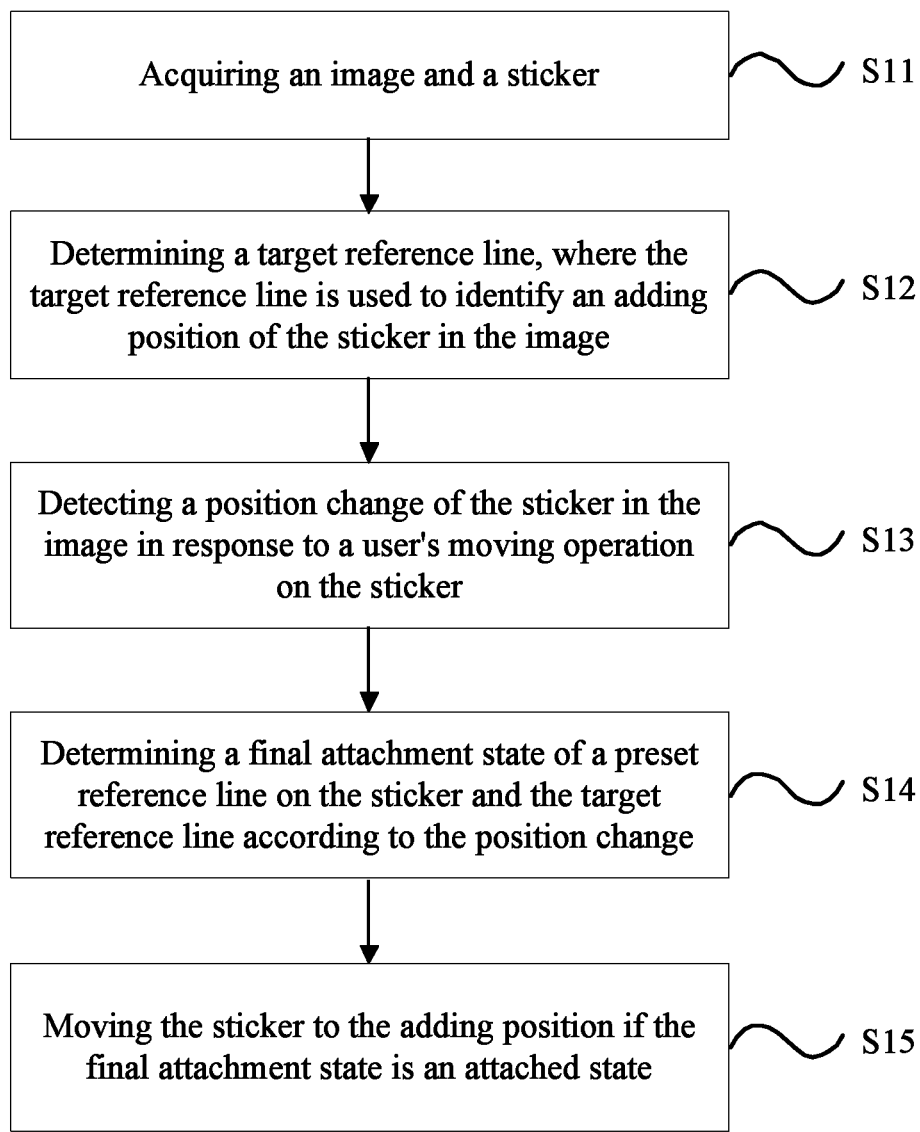
FIG. 1 is a schematic flowchart of a sticker processing method according to an embodiment of the present disclosure.

Embodiments of the present disclosure will be described in details below with reference to the accompanying drawings. While certain embodiments of the present disclosure are shown in the drawings, it should be understood that the present disclosure may be embodied in various forms and should not be construed as limited to the embodiments set forth herein, but rather these embodiments are provided for a thorough and complete understanding of the present disclosure. It should be understood that the drawings and embodiments of the present disclosure are only for illustrative purposes, and are not intended to limit the protection scope of the present disclosure.

It should be understood that the steps described in the method embodiments of the present disclosure may be performed in different orders and/or in parallel. Furthermore, the method embodiments may include an additional step and/or omit performing an illustrated step. The scope of the present disclosure is not limited in this regard.

As used herein, the term "including" and variations thereof are open-ended inclusions, i.e., "including but not limited to". The term "based on" is "based at least in part on". The term "an embodiment" means "at least one embodiment"; the term "another embodiment" means "at least one additional embodiment"; the term "some embodiments" means "at least some embodiments". Relevant definitions of other terms will be given in the description below.

Embodiment 1

In order to solve the technical problem that a sticker cannot be accurately positioned in the prior art, an embodiment of the present disclosure provides a sticker processing method. As shown in FIG. 1, the sticker processing method mainly includes the following step S11 to step S15.

Step S11: acquiring an image and a sticker.

Specifically, the image may be an image to which a sticker special effect is to be added, and may specifically be a video image input in real time (for example, a live video in a short video application), or a video image pre-stored in a terminal. The image may also be a still image, i.e., a picture. The terminal may be a mobile terminal, such as a smart phone or a tablet computer, and may also be a fixed terminal, such as a desktop computer.

The image may also be a template image corresponding to the image to which the sticker special effect is to be added. For example, if the image to which the sticker special effect is to be added is a face image, the corresponding template image may be a standard face template.

The sticker may be obtained from a local database or from the Internet.

Step S12: determining a target reference line, where the target reference line is used to identify an adding position of the sticker in the image.

Specifically, the target reference line may be customized by a user according to requirements. That is, the user may determine the target reference line according to the adding position of the sticker in the image. For example, if the user wants to add the sticker at a certain position in the image, the target reference line may be set at that position. In order to facilitate the user to locate the adding position of the sticker more accurately, coordinates of the reference line may also be determined according to a feature point of the image. For example, if the user wants to add the special effect to the eye area, the target reference line may be determined according to a feature point of the eye area, so that the sticker can be positioned to the eye area more accurately.

Step S13: detecting a position change of the sticker in the image in response to a user's moving operation on the sticker.

The moving operation on the sticker may be a dragging operation on the sticker, a zooming operation on the sticker, or a dragging deformation operation on the sticker, or the like. The dragging operation on the sticker may specifically be dragging the sticker to move horizontally, move up and down, or move obliquely, etc. The zooming operation on the sticker includes a proportionally zooming operation, a non-proportionally zooming operation, a centrally zooming operation, etc. The dragging deformation operation on the sticker is an operation of changing the shape of the sticker.

Step S14: determining a final attachment state of a preset reference line on the sticker and the target reference line according to the position change.

The position change may be a position change caused by moving the sticker, or a position change caused by zooming out or zooming in the sticker. Specifically, the position change may be controlled by the user. For example, the user may change the position of the sticker by moving the sticker, zooming out the sticker or zooming in the sticker using a mouse.

The preset reference line is a reference line on the sticker. When determining attachment, the preset reference line corresponds to the target reference line, that is, the preset reference line is a horizontal reference line, and accordingly, the target reference line is also a horizontal reference line; or, the preset reference line is a vertical reference line, and accordingly, the target reference line is also a vertical reference line. For example, the preset reference line is a first horizontal reference line, and accordingly, the target reference line is a second horizontal reference line; or, the preset reference line is a first vertical reference line, and accordingly, the target reference line is line is a second vertical reference line.

There may be multiple target reference lines, for example, one horizontal reference line and one vertical reference line, or multiple horizontal reference lines, or multiple vertical reference lines. When determining attachment, a target reference line corresponding to the preset reference line on the sticker is selected for determining.

Specifically, at least one of a upper boundary line of the sticker, a lower boundary line of the sticker, a horizontal center line of the sticker, a left boundary line of the sticker, a right boundary line of the sticker and a vertical center line of the sticker may be used as the preset reference line. When the preset reference line is at least one of the upper boundary line of the sticker, the lower boundary line of the sticker and the horizontal center line of the sticker, the corresponding target reference line is a horizontal reference line when determining attachment. When the preset reference line is at least one of the left boundary line of the sticker, the right boundary line of the sticker and the vertical center line of the sticker, the corresponding target reference line is a vertical reference line when determining attachment.

The final attachment state includes that the preset reference line is attached to the target reference line and that the preset reference line is not attached to the target reference line.

Step S15: moving the sticker to the adding position if the final attachment state is an attached state.

Specifically, when the final attachment state is the attached state, move the sticker to the adding position automatically to obtain a corresponding image with a sticker special effect. When the attachment state is a non-attached state, determine that the sticker does not reach the adding position, and then continue to change the position of the sticker continuously until the sticker is attached to the target reference line, to obtain a corresponding image with a sticker special effect; or, stop the moving operation of the sticker, and add the sticker to the current move position.

In this embodiment, the position of the sticker can be positioned precisely by determining the coordinates of the target reference line, determining the final attachment state of the preset reference line of the sticker and the target reference line according to the position change of the sticker in the image, and moving the sticker to the adding position if the final attachment state is the attached state.

In an embodiment, step S14 specifically includes the following sub-steps.

First sub-step: determining an initial attachment state of the preset reference line on the sticker and the target reference line before the position change.

The initial attachment state includes that the preset reference line is attached to the target reference line and the preset reference line is not attached to the target reference line.

Second sub-step: determining a distance between the preset reference line and the target reference line after the position change.

Specifically, the position change of the sticker is detected in real time, and the current position is determined according to the preset reference line of the sticker. The preset reference line may be customized by the user according to the adding position of the sticker. The preset reference line may specifically be the upper boundary, the lower boundary, the left boundary, the right boundary and/or a center line of the sticker. For example, if the sticker is rectangular, four boundaries and two centerlines of the sticker may be used as the preset reference lines. In this embodiment, there may be one or more preset reference lines. For example, when the preset reference line is the upper boundary of the sticker, the current position may be determined according to the upper boundary of the sticker. A distance between the current position and the target reference line is taken as the distance.

Third sub-step: determining the final attachment state of the preset reference line and the target reference line after the position change according to the initial attachment state and the distance.

In an embodiment, when the initial attachment state is the non-attached state and the distance is less than or equal to a preset attachment threshold, the final attachment state is that the preset reference line is attached to the target reference line.

The preset attachment threshold is the minimum distance at which attachment occurs. For example, the minimum distance may be represented by the minimum number of pixels in spacing.

The distance between the preset reference line and the target reference line is specifically the shortest distance between the preset reference line and the target reference line. For example, if the sticker is moved horizontally, then the corresponding preset reference line is a boundary of the sticker corresponding to the horizontal direction, the corresponding target reference line is a horizontal reference line, and the distance between the preset reference line and the target reference line is the shortest distance between these two horizontal lines.

If the sticker is moved vertically, then the corresponding preset reference line is a boundary of the sticker corresponding to the vertical direction. At present, the corresponding target reference line is a vertical reference line, and the distance between the preset reference line and the target reference line is the shortest distance between these two vertical lines.

If the sticker is moved obliquely, and if the corresponding preset reference line is a boundary corresponding to the sticker, at present, the preset reference line needs to be decomposed into a horizontal component and a vertical component to calculate separately when calculating the distance. For example, when the target reference line is a horizontal reference line, the horizontal component of the preset reference line is used to calculate the shortest distance to the horizontal reference line, and when the target reference line is a vertical reference line, the vertical component of the preset reference line is used to calculate the shortest distance to the vertical reference line.

When the distance between the preset reference line and the target reference line is less than or equal to the preset attachment threshold, the preset reference line is attached to the target reference line, thereby the final attachment state is determined to be the attached state. When multiple reference lines satisfying attachment exist in the same direction, the nearest reference line is selected for attachment. When an attachment condition is satisfied simultaneously in different directions, the attachment may be performed according to a preset attachment strategy. For example, the attachment strategy may be horizontal-direction preferential attachment or vertical-direction preferential attachment.

In an embodiment, when the initial attachment state is the non-attached state and the distance is greater than the preset attachment threshold, the final attachment state is that the preset reference line is not attached to the target reference line.

In an embodiment, when the initial attachment state is the attached state and the distance is less than or equal to a preset detachment threshold, the final attachment state is that the preset reference line is attached to the target reference line.

The preset detachment threshold is the minimum distance for detachment, which may be specifically represented by the minimum number of pixels in spacing.

Specifically, when the sticker is in the attached state before the position change, the user may further fine-tune the adding position of the sticker according to requirements, and at present, the position of the sticker may be further changed. When the distance between the preset reference line and the target reference line is less than or equal to the preset detachment threshold after the position change, the attachment state is still maintained as the attached state, that is, the final attachment state.

In an embodiment, when the initial attachment state is the attached state and the distance is greater than the preset detachment threshold, the preset reference line is triggered to move away from the target reference line, and the final attachment state is that the preset reference line is not attached to the target reference line.

Specifically, when the sticker is in the attached state before the position change, the user may further adjust the adding position of the sticker according to requirements, and at present, the position of the sticker may be further changed. When the distance between the preset reference line and the target reference line is greater than the preset detachment threshold after the position change, detachment occurs, and the sticker is triggered to move away from the target reference line. The attachment state changes from the attached state to the non-attached state, that is, the final attachment state.

In order to avoid repeated attachment, the preset attachment threshold should be less than or equal to the preset detachment threshold.

In an embodiment, step S14 specifically includes the following sub-steps.

First sub-step: determining position coordinates of a preset reference point on the preset reference line according to the position change.

For example, when the preset reference line is a boundary of the sticker, two end points and the midpoint of the boundary may be used as preset reference points.

Second sub-step: when the position coordinates are in a preset coordinate set, determining the final attachment state to be that the preset reference line is attached to the target reference line, where the preset coordinate set includes coordinates of each position point on the target reference line.

Since the user may delete the target reference line after the sticker is attached, in order to avoid misjudgment of the attachment state of the sticker, in this embodiment, a coordinate set including coordinates of all reference lines is stored in advance, and then the attachment state of the sticker is further determined according to the coordinates of the preset reference point at the current position.

In an embodiment, the method further includes the following steps.

Step S15: generating an implicit reference line automatically according to the image.

Specifically, there may be one or more implicit reference lines, and specific positions may correspond to at least one kind of four boundaries, two center lines and two middle lines of the image.

Step S16: attaching the sticker to the implicit reference line automatically when the sticker satisfies an attachment condition during the position change.

The attachment condition may be that a distance between the preset reference line of the sticker and the implicit reference line is less than or equal to the preset attachment threshold, or the coordinates of the preset reference point on the preset reference line are included in a coordinate set of the implicit reference line.

Those skilled in the art should understand that, obvious variations (for example, combinations of the listed modes) or equivalent substitutions may also be made on the basis of the above embodiments.

In the above, although the steps in the embodiments of the sticker processing method are described in the above order, it should be clear to those skilled in the art that the steps in the embodiments of the present disclosure are not necessarily executed in the above order. Other orders such as reverse, parallel, interleaved order may also be used, and on the basis of the above steps, those skilled in the art may also add other steps. These obvious variations or equivalent substitutions should also be included within the scope of protection of the present disclosure, which will be not repeated here.

The following are apparatus embodiments of the present disclosure. The apparatus embodiments of the present disclosure can be used to execute the steps implemented in the method embodiments of the present disclosure. For the convenience of description, only the parts related to the embodiments of the present disclosure are shown, and for specific technical details that are not disclosed, please refer to the method embodiments of the present disclosure.

Embodiment 2

Figure 2:
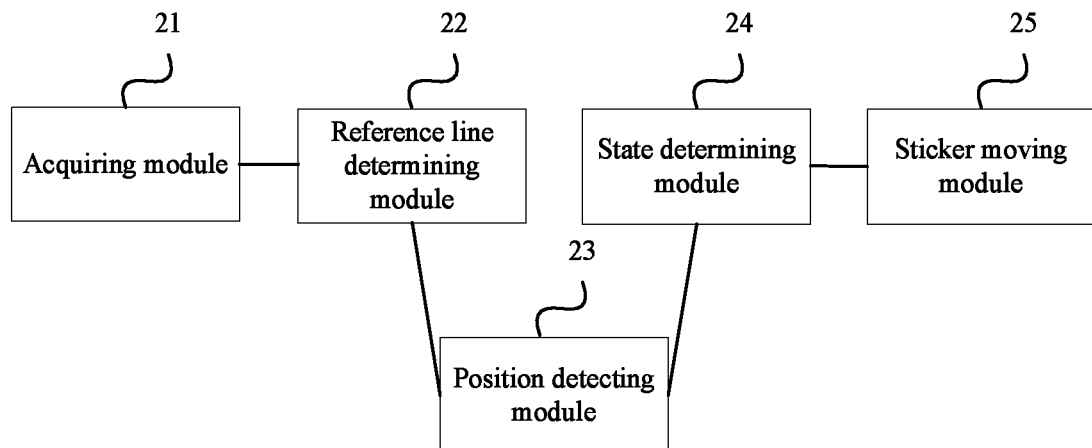
FIG. 2 is a schematic diagram of a sticker processing apparatus according to an embodiment of the present disclosure.

In order to solve the technical problem that a sticker cannot be accurately positioned in the prior art, an embodiment of the present disclosure provides a sticker processing apparatus. The apparatus can execute the steps in the embodiment of the sticker processing method described in Embodiment 1. As shown in FIG. 2, the apparatus mainly includes: an acquiring module 21, a reference line determining module 22, a position detecting module 23, a state determining module 24 and a sticker moving module 25; where, the acquiring module 21 is configured to acquire an image and a sticker;

the reference line determining module 22 is configured to determine a target reference line, where the target reference line is used to identify an adding position of the sticker in the image;

the position detecting module 23 is configured to detect a position change of the sticker in the image in response to a user's moving operation on the sticker;

the state determining module 24 is configured to determine a final attachment state of a preset reference line on the sticker and the target reference line according to the position change;

the sticker moving module 25 is configured to move the sticker to the adding position if the final attachment state is an attached state.

Further, the state determining module 24 is specifically configured to: determine an initial attachment state of the preset reference line on the sticker and the target reference line before the position change; and determine a distance between the preset reference line and the target reference line after the position change; and determine the final attachment state of the preset reference line and the target reference line after the position change according to the initial attachment state and the distance.

Further, when the initial attachment state is a non-attached state and the distance is less than or equal to a preset attachment threshold, the final attachment state is that the preset reference line is attached to the target reference line.

Further, when the initial attachment state is the attached state and the distance is less than or equal to a preset detachment threshold, the final attachment state is that the preset reference line is attached to the target reference line.

Further, when the initial attachment state is the attached state and the distance is greater than the preset detachment threshold, the preset reference line is triggered to move away from the target reference line, and the final attachment state is that the preset reference line is not attached to the target reference line.

Further, when the initial attachment state is the non-attached state and the distance is greater than the preset attachment threshold, the final attachment state is that the preset reference line is not attached to the target reference line.

Further, the state determining module 24 is specifically configured to: determine position coordinates of a preset reference point on the preset reference line according to the position change; when the position coordinates are in a preset coordinate set, the final attachment state is that the preset reference line is attached to the target reference line, where the preset coordinate set includes coordinates of each position point on the target reference line.

Further, the target reference line determining module 22 is further configured to generate an implicit reference line automatically according to the image;

the state determining module 24 is further configured to attach the preset reference line to the implicit reference line automatically when the sticker satisfies an attachment condition during the position change;

the sticker moving module 25 is further configured to add the sticker to the current move position according to the preset reference line. Further, the preset reference line is a first horizontal reference line, and accordingly, the target reference line is a second horizontal reference line; or, the preset reference line is a first vertical reference line, and accordingly, the target reference line is a second vertical reference line.

Further, the first horizontal reference line is any one of the following: an upper boundary line of the sticker, a lower boundary line of the sticker, and a horizontal center line of the sticker.

Further, the first vertical reference line is any one of the following: a left boundary line of the sticker, a right boundary line of the sticker, and a vertical center line of the sticker.

For detailed description of the working principle and achieved technical effects of the embodiments of the sticker processing apparatus, reference may be made to the relevant description in the foregoing embodiments of the sticker processing method, which will not be repeated here.

Embodiment 3

Figure 3:
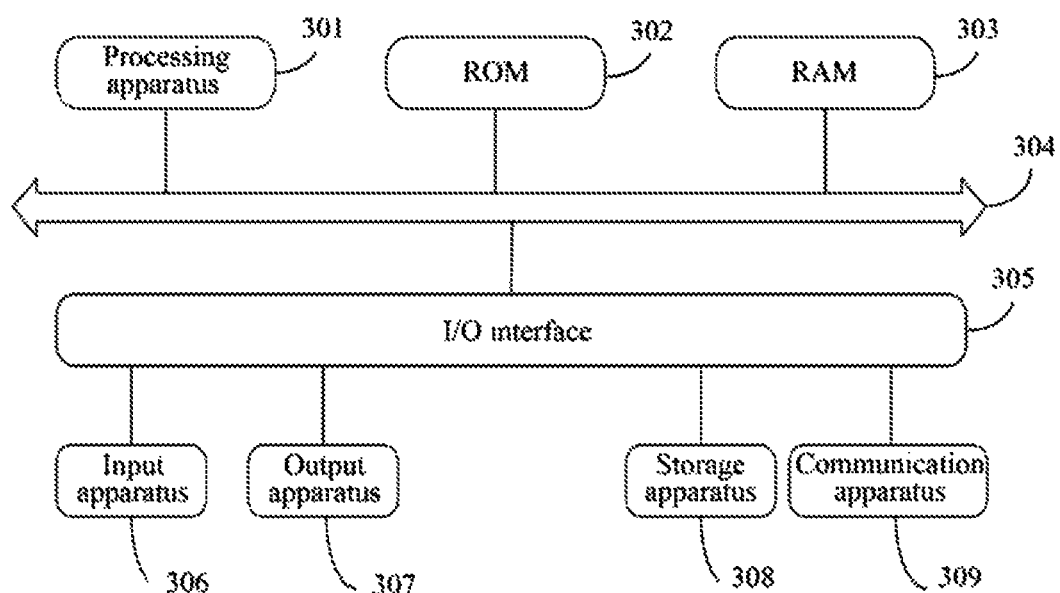
FIG. 3 is a schematic structural diagram of an electronic device according to an embodiment of the present disclosure.

Referring to FIG. 3, FIG. 3 shows a schematic structural diagram of an electronic device suitable for implementing embodiments of the present disclosure. The terminal device in the embodiments of the present disclosure may include, but is not limited to, a mobile terminal (such as a mobile phone, a laptop, a digital broadcast receiver, a PDA (Personal Digital Assistant), a PAD (Portable Android Device), a PMP (Portable Multimedia Player), an in-vehicle terminal (e.g., an in-vehicle navigation terminal), etc.) and a fixed terminal (such as a digital TV, a desktop computer, etc.). The electronic device shown in FIG. 3 is only an example, and should not impose any limitation on the functions and the scope of use of the embodiments of the present disclosure.

As shown in FIG. 3, the electronic device may include a processing apparatus (e.g., a central processing unit, a graphics processor, etc.) 301, which may execute various appropriate actions and processing based on a program stored in a read-only memory (ROM) 302 or a program loaded from a storage apparatus 308 into a random access memory (RAM) 303. In the RAM 303, various programs and data necessary for operations of the electronic device are also stored. The processing apparatus 301, the ROM 302 and the RAM 303 are connected to each other through a bus 304. An input/output (I/O) interface 305 is also connected to the bus 304.

Typically, the following apparatuses may be connected to the I/O interface 305: an input apparatus 306 including, for example, a touch screen, a touchpad, a keyboard, a mouse, a camera, a microphone, an accelerometer, a gyroscope, etc.; an output apparatus 307 including, for example, a liquid crystal display (LCD), a speaker, a vibrator, etc.; the storage apparatus 308 including, for example, a magnetic tape, a hard disk, etc.; and a communication apparatus 309. The communication apparatus 309 may allow the electronic device to communicate wirelessly or wired with other devices to exchange data. Although FIG. 3 shows the electronic device having various apparatuses, it should be understood that not all of the illustrated apparatuses are required to be implemented or provided. More or fewer apparatuses may alternatively be implemented or provided.

In particular, the processes described above with reference to the flowcharts may be implemented as a computer software program according to embodiments of the present disclosure. For example, an embodiment of the present disclosure includes a computer program product including a computer program carried on a non-transitory computer-readable medium, where the computer program includes program code for performing the methods illustrated in the flowcharts. In such an embodiment, the computer program may be downloaded and installed from a network via the communication apparatus 309, or installed from the storage apparatus 308, or installed from the ROM 302. When the computer program is executed by the processing apparatus 301, the above functions defined in the methods of the embodiments of the present disclosure are executed. Some embodiments of the present disclosure also include a computer program, and when the computer program runs on an electronic device, the above functions defined in the methods of the embodiments of the present disclosure are executed.

It should be noted that the computer-readable medium mentioned above in the present disclosure may be a computer-readable signal medium or a computer-readable storage medium, or any combination of the above two. For example, the computer-readable storage medium may be, but is not limited to, an electrical, magnetic, optical, electromagnetic, infrared or semiconductor system, apparatus or device, or any combination of the above. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that can be used by, or used in conjunction with, an instruction execution system, apparatus or device. In the present disclosure, the computer-readable signal medium may include a data signal propagated in baseband or as part of a carrier wave with computer-readable program code carried therein. Such a propagated data signal may take a variety of forms, including but not limited to an electromagnetic signal, an optical signal, or any suitable combination of the above. The computer-readable signal medium may also be any computer-readable medium other than the computer-readable storage medium, and the computer-readable signal medium may send, propagate, or transmit the program for use by, or use in connection with, the instruction execution system, apparatus or device. The program code contained on the computer-readable medium may be transmitted by any suitable medium, including but not limited to: an electric wire, an optical cable, RF (Radio Frequency) or the like, or any suitable combination of the above.

In some implementations, a client and a server may communicate using any currently known or future developed network protocol such as HTTP (HyperText Transfer Protocol), and may interconnect with digital data communications (e.g., a communication network) in any form or medium. Examples of the communication network include a local area network ("LAN"), a wide area network ("WAN"), an internet (e.g., the Internet), an end-to-end network (e.g., ad hoc end-to-end network), and any currently known or future developed networks.

The computer-readable medium may be included in the electronic device, or may exist alone without being assembled into the electronic device.

The computer-readable medium carries one or more programs, and when the one or more programs are executed by the electronic device, the electronic device is caused to: acquiring an image and a sticker; determining a target reference line, where the target reference line is used to identify an adding position of the sticker in the image; detecting a position change of the sticker in the image in response to a user's moving operation on the sticker; determining a final attachment state of the preset reference line on the sticker and the target reference line according to the position change; and moving the sticker to the adding position if the final attachment state is an attached state.

Computer program code for performing operations of the present disclosure may be written in one or more programming languages or combinations thereof. The programming languages include, but are not limited to, object-oriented programming languages—such as Java, Smalltalk, C++, and also include conventional procedural programming languages—such as "C" language or similar programming languages. The program code may be executed entirely on a user computer, partly on a user computer, as a stand-alone software package, partly on a user computer and partly on a remote computer, or entirely on a remote computer or server. In a case involving a remote computer, the remote computer may be connected to the user computer through any kind of network, including a local area network (LAN) or a wide area network (WAN), or may be connected to an external computer (e.g., connected through the Internet using an Internet service provider).

The flowcharts and block diagrams in the accompanying drawings illustrate architectures, functions and operations of possible implementations of systems, methods and computer program products according to various embodiments of the present disclosure. In this regard, each block in the flowcharts or block diagrams may represent a module, a program segment, or a portion of code which contains one or more executable instructions for implementing a specified logical function. It should also be noted that, in some alternative implementations, the functions marked in the blocks may also occur in an order different from those marked in the drawings. For example, two blocks shown in succession may actually be executed substantially in parallel, or the blocks may sometimes be executed in the reverse order, depending upon the function involved. It is also noted that each block of the block diagrams and/or flowcharts, and combinations of blocks in the block diagrams and/or flowcharts, may be implemented by a dedicated hardware-based system that performs specified functions or operations, or may be implemented by a combination of dedicated hardware and computer instructions.

The units involved in the embodiments of the present disclosure may be implemented in software or hardware. Names of the units do not constitute a limitation on the units per se in some cases. For example, the acquiring unit may also be described as "a unit for acquiring an image and a sticker".

The functions described herein above may be performed at least in part by one or more hardware logic components. For example, without limitation, exemplary types of hardware logic components which may be used include: a field programmable gate array (FPGA), an application specific integrated circuit (ASIC), an application specific standard product (ASSP), a system on chip (SOC), a complex programmable logic device (CPLD) and so on.

In the context of the present disclosure, a machine-readable medium may be a tangible medium that may contain or store a program for use by, or use in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the above. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

According to one or more embodiments of the present disclosure, a sticker processing method is provided, including:
  acquiring an image and a sticker;
  determining a target reference line, where the target reference line is used to identify an adding position of the sticker in the image; and detecting a position change of the sticker in the image in response to a user's moving operation on the sticker;
  determining a final attachment state of a preset reference line on the sticker and the target reference line according to the position change;
  moving the sticker to the adding position if the final attachment state is an attached state.

Further, determining the final attachment state of the preset reference line on the sticker and the target reference line according to the position change includes:
  determining an initial attachment state of the preset reference line on the sticker and the target reference line before the position change;
  determining a distance between the preset reference line and the target reference line after the position change;
  determining the final attachment state of the preset reference line and the target reference line after the position change according to the initial attachment state and the distance.

Further, when the initial attachment state is a non-attached state and the distance is less than or equal to a preset attachment threshold, the final attachment state is that the preset reference line is attached to the target reference line.

Further, when the initial attachment state is the attached state and the distance is less than or equal to a preset detachment threshold, the final attachment state is that the preset reference line is attached to the target reference line.

Further, when the initial attachment state is the attached state and the distance is greater than the preset detachment threshold, the preset reference line is triggered to move away from the target reference line, and the final attachment state is that the preset reference line is not attached to the target reference line.

Further, when the initial attachment state is the non-attached state and the distance is greater than the preset attachment threshold, the final attachment state is that the preset reference line is not attached to the target reference line.

Further, determining the final attachment state of the preset reference line on the sticker and the target reference line according to the position change includes:
  determining position coordinates of a preset reference point on the preset reference line according to the position change;
  when the position coordinates are in a preset coordinate set, determining the final attachment state to be that the preset reference line is attached to the target reference line, where the preset coordinate set includes coordinates of each position point on the target reference line.

Further, the method further includes:
  generating an implicit reference line automatically according to the image;
  when the sticker satisfies an attachment condition during the position change, attaching the preset reference line to the implicit reference line automatically;
  adding the sticker to a current move position according to the preset reference line. Further, the preset reference line is a first horizontal reference line, and accordingly, the target reference line is a second horizontal reference line; or, the preset reference line is a first vertical reference line, and accordingly, the target reference line is a second vertical reference line.

Further, the first horizontal reference line is any one of the following: an upper boundary line of the sticker, a lower boundary line of the sticker, and a horizontal center line of the sticker.

Further, the first vertical reference line is any one of the following: a left boundary line of the sticker, a right boundary line of the sticker, and a vertical center line of the sticker.

According to one or more embodiments of the present disclosure, a sticker processing apparatus is provided, including:
  an acquiring module, configured to acquire an image and a sticker;
  a reference line determining module, configured to determine a target reference line, where the target reference line is used to identify an adding position of the sticker in the image; a position detecting module, configured to detect a position change of the sticker in the image in response to a user's moving operation on the sticker;
  a state determining module, configured to determine a final attachment state of a preset reference line on the sticker and the target reference line according to the position change;
  a sticker moving module, configured to move the sticker to the adding position if the final attachment state is an attached state.

Further, the state determining module is specifically configured to: determine an initial attachment state of the preset reference line on the sticker and the target reference line before the position change; and determine a distance between the preset reference line and the target reference line after the position change; and determine the final attachment state of the preset reference line and the target reference line after the position change according to the initial attachment state and the distance.

Further, when the initial attachment state is a non-attached state and the distance is less than or equal to a preset attachment threshold, the final attachment state is that the preset reference line is attached to the target reference line.

Further, when the initial attachment state is the attached state and the distance is less than or equal to a preset detachment threshold, the final attachment state is that the preset reference line is attached to the target reference line.

Further, when the initial attachment state is the attached state and the distance is greater than the preset detachment threshold, the preset reference line is triggered to move away from the target reference line, and the final attachment state is that the preset reference line is not attached to the target reference line.

Further, when the initial attachment state is the non-attached state and the distance is greater than the preset attachment threshold, the final attachment state is that the preset reference line is not attached to the target reference line.

Further, the state determining module is specifically configured to: determine position coordinates of a preset reference point on the preset reference line according to the position change; when the position coordinates are in a preset coordinate set, determine the final attachment state to be that the preset reference line is attached to the target reference line, where the preset coordinate set includes coordinates of each position point on the target reference line.

Further, the target reference line determining module is further configured to generate an implicit reference line automatically according to the image;
  the state determining module is further configured to attach the preset reference line to the implicit reference line automatically when the sticker satisfies an attachment condition during the position change;
  the sticker moving module is further configured to add the sticker to the current move position according to the preset reference line. Further, the preset reference line is a first horizontal reference line, and accordingly, the target reference line is a second horizontal reference line; or, the preset reference line is a first vertical reference line, and accordingly, the target reference line is a second vertical reference line.

Further, the first horizontal reference line is any one of the following: an upper boundary line of the sticker, a lower boundary line of the sticker, and a horizontal center line of the sticker.

Further, the first vertical reference line is any one of the following: a left boundary line of the sticker, a right boundary line of the sticker, and a vertical center line of the sticker.

According to one or more embodiments of the present disclosure, an electronic device is provided, including:
- a memory, configured to store non-transitory computer-readable instructions; and
- a processor, configured to run the computer-readable instructions, where the above sticker processing method is implemented when the computer-readable instructions are executed by the processor.

According to one or more embodiments of the present disclosure, a computer-readable storage medium for storing non-transitory computer-readable instructions is provided. When the non-transitory computer-readable instructions are executed by a computer, the computer is caused to execute the above sticker processing method.

The above description is merely preferred embodiments of the present disclosure and an illustration of the applied technical principles. It should be understood by those skilled in the art that the scope of disclosure involved in the present disclosure is not limited to the technical solutions formed by the specific combination of the above technical features, and should also cover other technical solutions formed by any combination of the above technical features or equivalent features thereof without departing from the disclosed concept, for example, technical solutions formed by interchanging the above-mentioned features with, but not limited to, technical features having similar functions disclosed in the present disclosure.

In addition, while operations are depicted in a particular order, this should not be understood as requiring that such operations be performed in the particular order shown or in sequential order. In certain circumstances, multitasking and parallel processing may be advantageous. Likewise, while several specific implementation details are included in the above discussion, these should not be construed as limitations on the scope of the present disclosure. Certain features that are described in the context of separate embodiments may also be combined to be implemented in a single embodiment. Conversely, various features that are described in the context of a single embodiment may also be implemented in multiple embodiments separately or in any suitable sub-combinations.

Although the subject matter has been described in a language specific to structural features and/or logical actions of methods, it should be understood that the subject matter defined in the appended claims is not necessarily limited to the specific features or actions described above. Rather, the specific features and actions described above are merely example forms of implementing the claims.

What is claimed is:

1. A sticker processing method, comprising:
   acquiring an image and a sticker;
   determining a target reference line, wherein the target reference line is used to identify an adding position of the sticker in the image;
   detecting a position change of the sticker in the image in response to a user's moving operation on the sticker;
   determining a final attachment state of a preset reference line on the sticker and the target reference line according to the position change;
   moving the sticker to the adding position if the final attachment state is an attached state;
   wherein determining the final attachment state of the preset reference line on the sticker and the target reference line according to the position change comprises:
   determining an initial attachment state of the preset reference line on the sticker and the target reference line before the position change;
   determining a distance between the preset reference line and the target reference line after the position change;
   determining the final attachment state of the preset reference line and the target reference line after the position change according to the initial attachment state and the distance;
   wherein when the initial attachment state is the attached state and the distance is greater than a preset detachment threshold, the preset reference line is triggered to move away from the target reference line, and the final attachment state is that the preset reference line is not attached to the target reference line.

2. The method according to claim 1, wherein when the initial attachment state is a non-attached state and the distance is less than or equal to a preset attachment threshold, the final attachment state is that the preset reference line is attached to the target reference line.

3. The method according to claim 1, wherein when the initial attachment state is the attached state and the distance is less than or equal to a preset detachment threshold, the final attachment state is that the preset reference line is attached to the target reference line.

4. The method according to claim 1, wherein when the initial attachment state is a non-attached state and the distance is greater than a preset attachment threshold, the final attachment state is that the preset reference line is not attached to the target reference line.

5. The method according to claim 1, wherein determining the final attachment state of the preset reference line on the sticker and the target reference line according to the position change comprises:
   determining position coordinates of a preset reference point on the preset reference line according to the position change;
   when the position coordinates are in a preset coordinate set, determining the final attachment state to be that the preset reference line is attached to the target reference line, wherein the preset coordinate set comprises coordinates of each position point on the target reference line.

6. The method according to claim 1, wherein the method further comprises:
   generating an implicit reference line automatically according to the image;
   when the sticker satisfies an attachment condition during the position change, attaching the preset reference line to the implicit reference line automatically;
   adding the sticker to a current move position according to the preset reference line.

7. The method according to claim 1, wherein the preset reference line is a first horizontal reference line, and accordingly, the target reference line is a second horizontal reference line; or, the preset reference line is a first vertical reference line, and accordingly, the target reference line is a second vertical reference line.

8. The method according to claim 7, wherein the first horizontal reference line is any one of the following: an upper boundary line of the sticker, a lower boundary line of the sticker, and a horizontal center line of the sticker.

9. The method according to claim 7, wherein the first vertical reference line is any one of the following: a left boundary line of the sticker, a right boundary line of the sticker, and a vertical center line of the sticker.

10. A sticker processing apparatus, comprising:
a memory, configured to store non-transitory computer-readable instructions;
a processor, configured to run the non-transitory computer-readable instructions, when the non-transitory computer-readable instructions are executed by the processor, the processor is configured to:
acquire an image and a sticker;
determine a target reference line, where the target reference line is used to identify an adding position of the sticker in the image;
detect a position change of the sticker in the image in response to a user's moving operation on the sticker;
determine a final attachment state of a preset reference line on the sticker and the target reference line according to the position change;
move the sticker to the adding position if the final attachment state is an attached state;
wherein the processor is further configured to:
determine an initial attachment state of the preset reference line on the sticker and the target reference line before the position change;
determine a distance between the preset reference line and the target reference line after the position change;
determine the final attachment state of the preset reference line and the target reference line after the position change according to the initial attachment state and the distance;
wherein when the initial attachment state is the attached state and the distance is greater than a preset detachment threshold, the preset reference line is triggered to move away from the target reference line, and the final attachment state is that the preset reference line is not attached to the target reference line.

11. The apparatus according to claim 10, wherein when the initial attachment state is a non-attached state and the distance is less than or equal to a preset attachment threshold, the final attachment state is that the preset reference line is attached to the target reference line.

12. The apparatus according to claim 10, wherein when the initial attachment state is the attached state and the distance is less than or equal to a preset detachment threshold, the final attachment state is that the preset reference line is attached to the target reference line.

13. The apparatus according to claim 10, wherein when the initial attachment state is a non-attached state and the distance is greater than a preset attachment threshold, the final attachment state is that the preset reference line is not attached to the target reference line.

14. The apparatus according to claim 10, wherein the processor is further configured to:
determine position coordinates of a preset reference point on the preset reference line according to the position change;
when the position coordinates are in a preset coordinate set, determine the final attachment state to be that the preset reference line is attached to the target reference line, wherein the preset coordinate set comprises coordinates of each position point on the target reference line.

15. The apparatus according to claim 10, wherein the processor is further configured to:
generate an implicit reference line automatically according to the image;
when the sticker satisfies an attachment condition during the position change, attach the preset reference line to the implicit reference line automatically;
add the sticker to a current move position according to the preset reference line.

16. A non-transitory computer-readable storage medium, configured to store non-transitory computer-readable instructions which, when executed by a computer, causes the computer to:
acquire an image and a sticker;
determine a target reference line, where the target reference line is used to identify an adding position of the sticker in the image;
detect a position change of the sticker in the image in response to a user's moving operation on the sticker;
determine a final attachment state of a preset reference line on the sticker and the target reference line according to the position change;
move the sticker to the adding position if the final attachment state is an attached state;
wherein the computer is further caused to:
determine an initial attachment state of the preset reference line on the sticker and the target reference line before the position change;
determine a distance between the preset reference line and the target reference line after the position change;
determine the final attachment state of the preset reference line and the target reference line after the position change according to the initial attachment state and the distance;
wherein when the initial attachment state is the attached state and the distance is greater than a preset detachment threshold, the preset reference line is triggered to move away from the target reference line, and the final attachment state is that the preset reference line is not attached to the target reference line.

* * * * *